O. SPRAGUE.
Bee Hive.
No. 47,047.
Patented March 28, 1865.
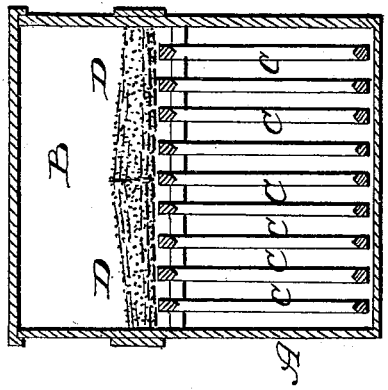
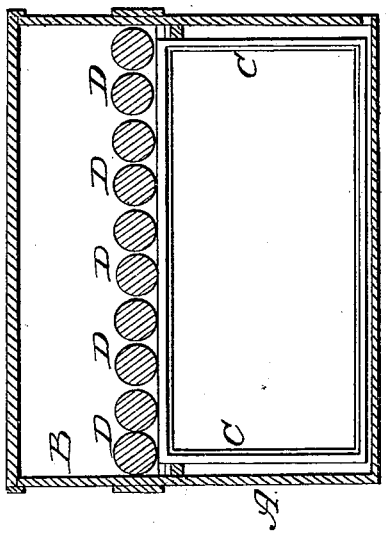
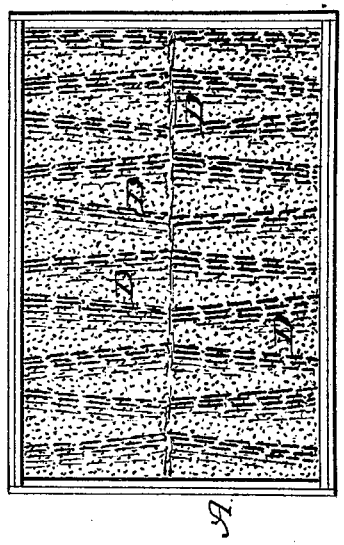
Witnesses
C. D. Smith
S. V. Reeve
Inventor
O. Sprague
By Munn & Co
Attorneys.

UNITED STATES PATENT OFFICE.

ORLANDO SPRAGUE, OF FULTON, ILLINOIS.

IMPROVEMENT IN BEE-HIVES.

Specification forming part of Letters Patent No. 47,047, dated March 28, 1865.

*To all whom it may concern:*

Be it known that I, ORLANDO SPRAGUE, of Fulton, in the county of Whiteside and State of Illinois, have invented a new and useful Improvement in Bee-Hives for Wintering Bees in the Open Air; and I do hereby declare the following to be a full and exact description of the same, reference being had to the accompanying drawings, making part of this specification, in which—

Figure 1 is a vertical longitudinal section of a bee-hive illustrating my invention. Fig. 2 is a vertical transverse section of the same. Fig. 3 is a plan of the same with the upper casing for the honey-boxes removed.

Similar letters of reference indicate corresponding parts in the several figures.

By extensive and invariably successful experiments I have discovered that dry corn-cobs constitute a lining for bee-hives far superior to any hitherto known. The cobs are excellent absorbents of water, and also non-conductors of heat, and if placed in a hive as lining therefor, or as a substitute for the honey-box board or roof of the main chamber, they preserve the hive in a warm dry condition during the fall and winter.

The following description will enable those skilled in the art to which my invention appertains to fully understand and use the same.

In the drawings, A may represent a hive of any suitable form, and B an upper casing containing the movable honey-boxes. In the hive here represented it is customary to use movable comb-frames C, the top slats of which are covered by a floor for the honey-boxes to rest upon. Now, in cold weather the upper cover or chamber of the hive will become filled with frost from condensed moisture arising from the breath of the bees, which will often, through atmospheric changes, prove their destruction. This frost cannot, when melted, (if a lining of corn-cobs is used,) wet the colony, as the cobs will absorb and retain all the dampness which can possibly arise from the breath of the bees or other causes.

I remove the said board and cover the tops of the movable frames with corn-cobs D, cut into proper lengths, if that is necessary to make them fit, and adjust them neatly, so as to cover the space.

The cobs absorb the moisture made by the breath of the bees and exclude external moisture and cold.

Fig. 2 illustrates the complete lining of the hive with cobs should it be deemed necessary.

The cobs are universally accessible and obtainable at little expense, and their durability and efficiency will at once recommend them to the favorable consideration of apiarists and others interested in bees.

I propose to employ the cobs in any hive, the one shown in the drawings having been selected for representation simply because it has been approved and is well known.

Having thus described my invention, what I claim as new herein, and desire to secure by Letters Patent, is—

The use of corn-cobs as a lining or covering for or in connection with bee-hives, substantially as and for the purpose set forth.

To the above specification of my improvement in bee-hives I have signed my hand this 13th day of January, 1865.

ORLANDO SPRAGUE.

Witnesses:
 CHARLES D. SMITH,
 S. V. REEVE.